UNITED STATES PATENT OFFICE.

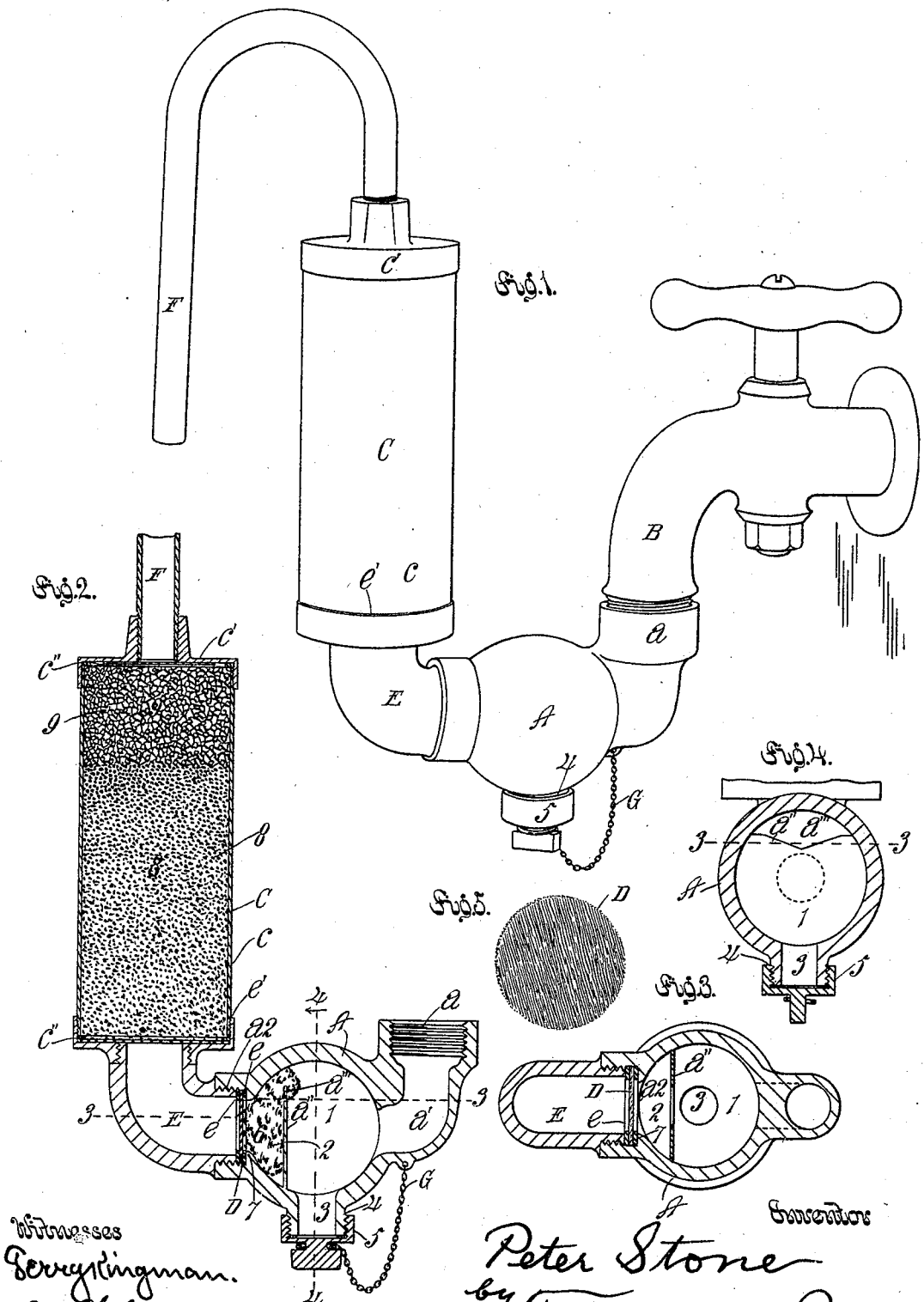

PETER STONE, OF LOS ANGELES, CALIFORNIA.

SIPHON CARBON FAUCET-FILTER.

SPECIFICATION forming part of Letters Patent No. 616,031, dated December 13, 1898.

Application filed January 11, 1898. Serial No. 666,360. (No model.)

*To all whom it may concern:*

Be it known that I, PETER STONE, a citizen of the United States, residing at Los Angeles, in the county of Los Angeles and State of California, have invented a new and useful Siphon Carbon Faucet-Filter, of which the following is a specification.

The objects of my invention are to provide a perfect and simple faucet-filter which is so constructed as to allow the water to be drawn direct from the faucet without being filtered and which when desired may be used to perfectly filter the water to remove therefrom all sediment, animalcula, and other impurities held in suspension; also to provide for the deposit of sediment at such a point as to allow the same to be instantly washed out when the open-draft outlet is opened to draw the water direct from the faucet.

My invention includes a faucet-filter comprising a sediment-chamber having two compartments, with a passage communicating with said compartments, one of said compartments being provided with an inlet and with an open-draft outlet opening downward from the bottom of said compartment and the other of said compartments being provided with a discharge-opening leading to a carbon filter-chamber, means for temporarily closing the open-draft outlet, a porous stopper, such as a sponge, in the discharge-compartment, a sheet, plug, or disk of yucca wood across the discharge-opening which leads from the discharge-compartment, a filtering-chamber containing carbon and connected with the discharge-opening, and a siphon-pipe leading from the top of the carbon filtering-chamber. The carbon filtering-chamber is preferably filled about three-fourths full of granulated bone-charcoal, and the other quarter is filled with filtering-quartz, the ends of the chamber being provided with perforated sheet-metal plates or wire screens to retain the filtering material in such filtering-chamber.

The accompanying drawings illustrate my invention.

Figure 1 is a perspective view of my newly-invented siphon carbon faucet-filter in position on a faucet and ready for furnishing filtered water. Fig. 2 is a vertical mid-section of the filter, a fragment of the siphon being broken away. Fig. 3 is a horizontal plan section on line 3 3, Fig. 2. Fig. 4 is a cross-section on line 4 4, Fig. 2, looking to the left. Fig. 5 is a view, on a larger scale, of the filtering-disk or sheet of yucca wood.

The sediment-chamber A has a screw-threaded socket $a$ to screw upon the faucet B, and the inlet-opening $a'$ leads downward from the socket $a$ and enters the first compartment 1 of the sediment-chamber at a downward inclination, so that the water will strike against the lower portion of the partition $a''$ and will not pass in a direct current from the inlet $a'$ to the passage $a'''$, which communicates between the compartment 1 and the compartment 2 of the sediment-chamber. The interior cavity of the sediment-chamber, comprising the two compartments 1 and 2, is preferably of a globular form, and the partition $a''$ is located about two-thirds of the distance between the inlet $a'$ into the sediment-chamber and the outlet $a^2$ leading from the said chamber, so that the sediment-depositing chamber 1 is much larger than the discharge-compartment 2, and the open-draft outlet 3 opens downward from the lowest part of said globular chamber. The outlet 3 preferably terminates in a screw-threaded nipple 4, for which is provided a cap 5 to close the same when the filter proper is to be used and to open the outlet 3 when it is desired to cleanse the sediment-depositing chamber or to draw water direct from the faucet. In the discharge-compartment 2 of the sediment-chamber I provide a stopper 6, of sponge or some other porous material, which will intercept the water and reduce the pressure, which otherwise might be so great as to force the water too rapidly through the carbon filter proper, C. The sponge or other porous material 6 will be packed into the compartment 2 to form a plug of greater or less porosity, as may be desired for the water pressure to which it will be subjected, and a portion of the sponge will thus be made to project through the passage $a'''$ and into the compartment 1. The passage $a'''$ is preferably at the top or upper portion of the globular chamber 1 2, and the projecting sponge overhangs the partition $a''$, thus to intercept any rising particles of matter in suspension and cause the same to drop down and fall into the receptacle formed by the outlet 3 at the bottom of the sediment-chamber. The effect of the incoming water striking against the partition $a''$ and thence rising to flow out through the passage $a'''$ will be to break the current of the water, so that it does not pass directly from the inlet $a$, but passes upward with a diminished current, so that the sediment can settle and deposit in the receptacle 3 at the bottom of the chamber.

D indicates a porous partition formed of a disk, sheet, or thin plug of the wood of the *Yucca brevifolia*, which I have discovered to be of superior value for use in filtering for the purpose of intercepting any material held in suspension. The said wood is very fibrous and is sufficiently porous to allow the water to be forced therethrough when under pressure, but the fibers will prevent the passage of minute particles of matter.

E indicates an elbow connection carrying the carbon-chamber or filter proper, C, and being screw-threaded and screwed into the discharge-opening $a^2$ of the sediment-chamber.

$e$ indicates a gasket or washer between the end of the elbow connection E and the yucca disk D.

7 indicates an annular shoulder at the outlet-mouth of the discharge-opening $a^2$, against which the disk D fits. The disk D and the gaskets $e$ are of such thickness relative to the length of the screw-threaded portion of the connection-elbow E as to cause the connection E to compress the washer and the disk between the connection and the shoulder 7.

It is to be understood that the discharge-opening $a^2$ and the yucca disk D may be of any desired size to allow the passage of a greater or less quantity of water, and also that the carbon-chamber C and all of the other parts of the filter may be made of any desired size for any desired service.

The disk and discharge-opening should be ample to allow a sufficient flow to supply the carbon-chamber freely without too rapid a flow through the disk. The disk is made sufficiently thick, so that, together with the sponge, it will prevent the water from being forced through the carbon-chamber C under too high pressure.

The upper end of the elbow connection E is provided with a screw-socket $e'$, into which is screwed the cylindrical wall $c$ of the filter proper.

$c$ indicates the top cap for the filter proper.

$c''$ indicates wire screens at the bottom and top of the filter proper to retain the filtering material in place.

F indicates the siphon-pipe, screwed into the top filter-cap $c'$ and leading up therefrom and discharging downward at the side of the filter proper.

G indicates a chain connecting the cap 5 with the body of the sediment-chamber, so that the cap will not be lost when not in use.

In practice the filter is attached to the faucet by screwing the socket $a$ upon the faucet, and when desired to draw water direct from the faucet the cap 5 will be unscrewed, and the device is then ready for use as an ordinary faucet. When it is desired to filter the water, the cap 5 is screwed in place, and when the faucet is open the water will flow through the inlet $a'$ into the sediment-chamber, striking against the partition $a''$, the force of the current thereby being broken, and the water rising thence will come into contact with the sponge, and the sediment will be thereby precipitated and prevented from flowing out through the compartment 2. The water passing through the sponge will also pass through the yucca sheet, and the sponge and yucca sheet will retain the particles of solid matter, so that the water flowing through the elbow connection E will be apparently pure, and passing thence through the granulated bone-charcoal 8 and the quartz 9 in the filter proper it will be thoroughly purified and will pass out through the siphon F in perfect condition for drinking purposes. The sediment falling from the water in the sediment-chamber will enter the neck 3 of the open-draft outlet and is there entirely out of the path of the water-current, so that the inflowing water does not carry up the previously-deposited sediment. When the cap 5 is again removed, the sediment is washed out of the outlet-neck 3, and when the faucet is opened the water flowing through the sediment-chamber and out of the outlet 3 immediately cleanses the chamber 1.

From time to time, as may be found to be desirable, the connection E will be unscrewed from the sediment-chamber, and the yucca disk and the sponge will be removed and thoroughly cleansed from any impurities which they may have entangled. Then the sponge and yucca may be replaced or new substituted, and the filter is again in perfect condition.

Now, having described my invention, what I claim as new, and desire to secure by Letters Patent, is—

1. A faucet-filter comprising a sediment-chamber having two compartments with a passage communicating between said compartments, one of said compartments being provided with an inlet and with an outlet opening from the bottom of said compartment, and the other of said compartments being provided with a discharge-opening; means for temporarily closing the outlet from the first compartment; a porous stopper in the second compartment; a sheet of yucca wood across the discharge-opening; a filtering-chamber containing carbon and connected with the discharge-opening; and a siphon-pipe leading from the top of the carbon filtering-chamber.

2. A faucet-filter comprising a sediment-chamber having two compartments with a passage communicating between said compartments, an inlet opening into one of said compartments, an outlet opening from the other of said compartments, an outlet leading from the bottom of the inlet-compartment; means for temporarily closing the bottom outlet; a porous stopper in the discharge-compartment; a filtering-chamber containing carbon and having a siphon leading from the top; and a connection between the discharge-outlet and the bottom of the carbon filter.

3. In a filter, a sediment-chamber divided into two compartments by a partition with a passage between the compartment at the top of the partition, an outlet being provided at the bottom of one compartment, an inlet leading into said compartment and a discharge leading from the other compartment; and means for temporarily closing the outlet.

4. In a filter, a sediment-chamber having two compartments with a passage between, an inlet being provided into and an outlet from one of the compartments and a discharge-opening from the other compartment; and a sponge stopper in the other compartment with a sheet of yucca wood fastened across the discharge-opening.

5. In a filter, a partition composed of a sheet of the wood of the *Yucca brevifolia*.

PETER STONE.

Witnesses:
JAMES R. TOWNSEND,
F. M. TOWNSEND.